United States Patent [19]

Magnaval et al.

[11] Patent Number: 5,137,126
[45] Date of Patent: Aug. 11, 1992

[54] ELECTROMECHANICAL CONTROL HAVING A CENTRIFUGAL STRUCTURE

[75] Inventors: Jean-Louis Magnaval, Neuilly-Plaisance; Jean-Charles Maligne, Aubervilliers, both of France

[73] Assignee: Bendix Europe Services Techniques, Drancy, France

[21] Appl. No.: 740,249

[22] Filed: Aug. 5, 1991

[30] Foreign Application Priority Data

Sep. 28, 1990 [FR] France .................. 90 12014

[51] Int. Cl.⁵ .............................................. F16D 15/00
[52] U.S. Cl. .................................. 188/343; 188/72.7; 188/187; 192/105 BA; 192/105 B
[58] Field of Search ............... 188/72.7, 82, 84, 180, 188/184, 185, 187, 342, 343, 181 A; 192/105 BA, 105 B

[56] References Cited

U.S. PATENT DOCUMENTS

| | | | |
|---|---|---|---|
| 2,069,680 | 2/1937 | Pigneau | 188/140 |
| 4,216,848 | 8/1980 | Shimodiara | 188/184 |
| 4,809,823 | 3/1989 | Fargier | 188/72.7 |
| 4,856,623 | 8/1989 | Romig, Jr. | 188/187 |
| 5,070,984 | 12/1991 | Fehring | 192/105 B |

Primary Examiner—Robert J. Oberleitner
Assistant Examiner—Chris Schwartz
Attorney, Agent, or Firm—Larry J. Palguta; Decker Ken C.

[57] ABSTRACT

The invention concerns an electromechanical control having a centrifugal structure comprising a shaft (22) driven in rotation by an electric motor (20) and defining an axis, at least two flyweights (38) capable of moving under the effect of a centrifugal force between a plate (34) and a disk (32), the plate (34) being able to be driven in rotation by the shaft, and a wedge device (12). According to the invention, the shaft (22) is mounted movably in axial translation to drive in translation the wedge device (12), and the plate (34) is axially fixed whereas the disk (32), which solidly fixed to an axial sleeve (30) forming, with the end (24) of the shaft (22), a lockable screw-nut assembly, is capable of axial translation and can be driven in rotation by the shaft (22), the radial position of the flyweights (38) determining the separation of the disk (32) and the plate (34). Application to the braking of vehicles.

4 Claims, 1 Drawing Sheet

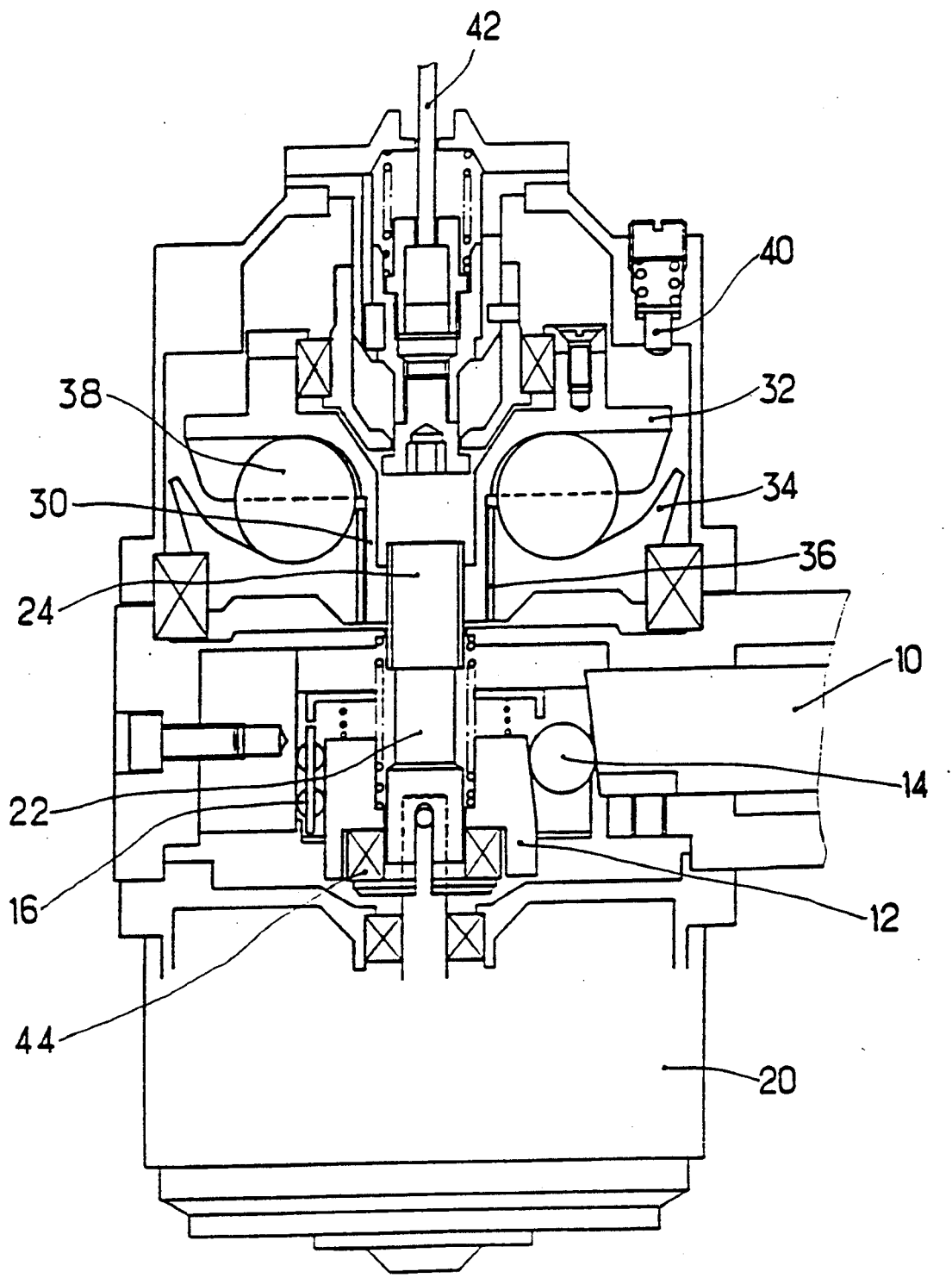

ELECTROMECHANICAL CONTROL HAVING A CENTRIFUGAL STRUCTURE

BACKGROUND OF THE INVENTION

The present invention concerns an electromechanical control having a centrifugal structure intended, especially, to equip a wedge-type brake for a motor vehicle.

The document U.S. Pat. No. 4,809,823 describes a braking device equipped with such a control, and comprising a shaft driven in rotation by an electric motor, at least two flyweights capable of moving under the effect of a centrifugal force between a disk and a plate, and a wedge device transforming a translation along a first axis into a translation along a second axis.

The present invention has the object of improving such a control. This is because it is known that at the beginning of braking it is necessary to move the friction members rapidly to bring them into contact with the disk to be braked and that, for this step, only a small force is required, while subsequently the movement is small but the force required is large.

In addition, the brake mechanism is often required to be equipped with a manual control for parking a vehicle so equipped.

SUMMARY OF THE INVENTION

The electromechanical control according to the invention meets these criteria thanks to the features that are the subject of the first claim.

According to the invention, the shaft of the electromechanical control having a centrifugal structure is mounted movably in axial translation to drive the wedge device in translation, and the plate is axially fixed whereas the disk, which is solidly attached to an axial sleeve forming, with the end of the shaft, a lockable screw-nut assembly, is capable of axial translation and can be driven in rotation by the shaft.

The position of the flyweights determines the separation between the disk and the plate.

BRIEF DESCRIPTION OF THE DRAWING

The invention will now be described by way of example with reference to the accompanying drawings in which:

the sole figure represents schematically a section of a device for actuating a wedge-type brake utilizing the electromechanical control having a centrifugal structure according to the invention.

DETAILED DESCRIPTION OF THE INVENTION

Now with reference to this sole figure, a man skilled in the art will recognize at 10 the actuating piston of the brake whose translation is caused by that of the wedge device 12, a roller 14 and a guiding means 16 helping the translation of these components in a manner known per se.

An electric motor 20 drives in rotation a shaft 22 which defines an axis and which is mounted movably in axial translation in order to be able to drive in translation the wedge device 12. The end 24 of the shaft 22 is threaded in order to form a screw cooperating with an axial sleeve 30 screwed onto the end 24 of the shaft 22.

This sleeve 30 is solidly attached to a disk 32. A plate 34, fixed in axial translation, is driven in rotation with the sleeve 30 and the disk 32 owing, for example, to grooves 36 cut into the periphery of the sleeve 30 and on the interior wall of the plate 34.

Two flyweights 38, in the form of balls in the example shown, constitute the centrifugal structure. They are capable of moving between the plate 34 and the disk 32 under the effect of a centrifugal force. Owing to the form of the facing walls of the plate 34 and of the disk 32, the radial position of the balls determines the separation between the plate 34 and the disk 32.

A sliding contact 40 completes the assembly and allows the rotation of the disk 32 to be braked when the latter enters into contact therewith.

The mode of operation is as follows. At rest, the device is in the state shown. On application of electric power to the motor 20, the shaft 22 starts to rotate. Due to the thread cut on the end 24 of the shaft, the sleeve 30 and the shaft form a screw-nut assembly, the shaft 22 screwing into the sleeve 30. In effect, the inertia of the disk 32, the plate 34 and the balls 38 brakes the sleeve 30 with respect to the shaft 22. The latter then moves axially, driving the wedge device 12 rapidly in translation through the intermediary of the ball stop 44. As a reaction, the piston 10 is also driven in translation, which ensures bringing the friction linings into contact with the disk in the application of the described control to a wedge-type disk brake.

When the shaft 22 can screw no farther into the sleeve 30, owing to the retention of the wedge device 12 then bearing on the roller 14, it drives this sleeve in rotation. The assembly comprising the sleeve 30, the disk 32, the plate 34 and the balls 38 thus starts to rotate with the shaft 22.

Under the effect of the centrifugal force, the balls 38 tend to move away from the axis and, thus, to separate the disk 32 from the plate 34 which is fixed in axial translation. In moving, the disk 32 of course entrains the sleeve 30 and, consequently, the shaft 22 which is at that moment solidly attached to it. The latter drives the wedge device 12, but the axial movement is limited due to the reaction of the piston 10, a large force therefore being transmitted to the friction linings.

To release the force, it is sufficient to slow down the rotation of the shaft 22 by cutting for example the electric supply of the motor 20.

Due to the aforementioned inertia, the sleeve 30 then unscrews from the end 24 of the shaft 22. The latter then returns to the position shown, bringing back at the same time the wedge device 12 and, therefore, releasing the force exerted on the piston 10.

The translation movement of the disk 32 is therefore no longer limited by the reaction exerted by the piston 10 and, under the effect of the centrifugal force, the balls 38, which cooperate with the slope provided on the plate 34, again separating the disk 32 in contact with the sliding contact 40. The friction thus obtained then strongly brakes the assembly comprising the disk 32, plate 34 and balls 38. The rotor of the electric motor 20, having a certain inertia, continues to turn, thus causing the rescrewing of the sleeve 30 onto the end 24 of the shaft 22. The force exerted by the piston 10 blocks the translation of the wedge device 12, and the sleeve returns then to the position shown where the whole assembly is immobilized.

Note that the braking effort may be easily moderated by controlling the speed of the electric motor 20.

To supplement the electromechanical control with a manual control, it is then only necessary to add a pull cable 42 able to drive the shaft 22 and, thus, the wedge device 12 manually in translation.

The control thus achieves the aforementioned objects and is simple and reliable.

A man skilled in the art will be able to add numerous modifications thereto without leaving the scope of the invention as defined by the accompanying claims.

What we claim is:

1. An electromechanical control having a centrifugal structure comprising a shaft driven in rotation by an electric motor and defining an axis, at least two flyweights capable of moving under the effect of a centrifugal force between a plate and a disk, said plate being able to be driven in rotation by said shaft, and a wedge device, said shaft being mounted movably in axial translation to drive said wedge device in translation, and that said plate being axially fixed whereas said disk, which is solidly fixed to an axial sleeve forming, with an end of said shaft, a lockable screw-nut assembly, is capable of axial translation and can be driven in rotation by said shaft, the radial position of said flyweights determining a separation of said disk and said plate.

2. The electromechanical control having a centrifugal structure according to claim 1, wherein said disk is able to come into contact with a fixed sliding contact in such a manner as to be braked.

3. The electromechanical control having a centrifugal structure according to claim 1, wherein said disk is solidly fixed axially to a manual pull cable fixed in rotation.

4. A wedge brake comprising an electromechanical control having a centrifugal structure comprising a shaft driven in rotation by an electric motor and defining an axis, at least two flyweights capable of moving under the effect of a centrifugal force between a plate and a disk, said plate being able to be driven in rotation by said shaft, and a wedge device, said shaft being mounted movably in axial translation to drive said wedge device in translation, and that said plate being axially fixed whereas said disk, which is solidly fixed to an axial sleeve forming, with an end of said shaft, a lockable screw-nut assembly, is capable of axial translation and can be driven in rotation by said shaft, the radial position of said flyweights determining a separation of said disk and said plate, said wedge device driving along a second axis an operating piston of said brake.

* * * * *